United States Patent [19]

Hickner et al.

[11] 3,875,187

[45] Apr. 1, 1975

[54] 3-MERCAPTOMETHYL AND 3-ORGANOTHIOMETHYL-4-METHYL

[75] Inventors: Richard A. Hickner; Corwin J. Bredeweg; Raymond A. Plepys, all of Midland, Mich.

[73] Assignee: The Dow Chemical Company, Midland, Mich.

[22] Filed: May 12, 1972

[21] Appl. No.: 252,625

Related U.S. Application Data

[62] Division of Ser. No. 794,411, Jan. 27, 1969, Pat. No. 3,682,965.

[52] U.S. Cl. .......................... 260/347.2, 204/158 R
[51] Int. Cl. .............................................. C07d 5/04
[58] Field of Search ............... 260/347.2; 204/158 R

[56] References Cited
FOREIGN PATENTS OR APPLICATIONS
1,098,942   2/1961   Germany

*Primary Examiner*—Norma S. Milestone
*Assistant Examiner*—Bernard Dentz
*Attorney, Agent, or Firm*—Chessie E. Rehberg

[57] ABSTRACT

Novel sulfur-containing pyrrolidines and tetrahydrofurans having the formula

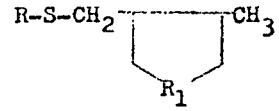

(where $R_1$ is oxygen or an amino group) are produced by reacting, under free radical conditions, a diallyl ether or a diallyl amine with a mercaptan. These new compounds are useful surface active agents, plasticizers and stabilizers and, in addition, have biological activity.

5 Claims, No Drawings

3-MERCAPTOMETHYL AND 3-ORGANOTHIOMETHYL-4-METHYL

This is a division of application Ser. No. 794,411 filed Jan. 27, 1969 now U.S. Pat. No. 3,682,965.

BACKGROUND OF THE INVENTION

It has been reported that 1,6-heptadienes of the formula $(CH_2=CH-CH_2-)_2A$ (where A is C, Si, N, P, O or S) produce six-membered rings when contacted with certain chain transfer agents, e.g. n-butyl mercaptan. See Friedlander et al., German Pat. No. 1,098,942.

SUMMARY OF THE INVENTION

It has now been found that sulfur-containing pyrrolidines and tetrahydrofurans having the formula

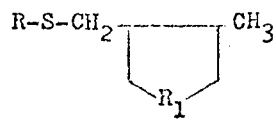

are produced by reacting, under free radical initiating conditions, a diallyl ether or a diallyl amine with $H_2S$ or a mercaptan where R is H, alkyl having up to eighteen carbon atoms (preferably alkyl having up to ten carbon atoms), carboxyalkyl of the type $-CH_2-{}_nCOOR_2$ where $R_2$ is H or alkyl having up to twelve carbon atoms and $n$ is 1–4, allyl, phenyl, phenalkyl having up to 16 carbon atoms (preferably phenalkyl having up to 10 carbon atoms), or halo- (preferably chloro- or bromo-) or hydroxy-substituted groups of the foregoing type, and $R_1$ is oxygen or

where $R_3$ is H, alkyl having up to six carbon atoms (preferably methyl), alkenyl having up to six carbon atoms, phenyl, phenalkyl having up to eight carbon atoms, acyl having up to 18 carbon atoms (preferably acyl having up to six carbon atoms), $-SO_2R_4$ where $R_4$ is alkyl having up to six carbon atoms or phenyl, or halo- (preferably chloro- or bromo-), nitro- or hydroxy-substituted groups of the foregoing type.

In order to practice the invention, a diallyl ether or a diallyl amino compound (or a salt of said amino compound) having the formula

$CH_2=CH-CH_2-R_1-CH_2-CH=CH_2$ (where $R_1$ is defined above) is reacted, under free radical initiating conditions, by contact, in any convenient manner, with a mercaptan having the formula

R—SH (where R is defined above). After reaction, the pyrrolidine or tetrahydrofuran produced (depending upon whether $R_1$ is oxygen or an amino group) is separated from the reaction mixture by conventional methods, e.g. distillation.

Diallyl ether is a useful and preferred starting material for producing a tetrahydrofuran in accordance with this invention.

Typical of the diallyl amino compounds useful for producing a pyrrolidine in accordance with this invention are diallylamine; the N,N-diallylalkylamines, e.g. N,N-diallylmethylamine, N,N-diallylhexylamine; the N,N-diallylalkenylamines, e.g. triallylamine, N,N-diallyl-2-methallylamine, N,N-diallylbutenylamine; N,N-diallylaniline; the N,N-diallylphenalkylamines, e.g. N,N-diallylphenethylamine; the N,N-diallylacylamides, e.g. N,N-diallylbenzamide, N,N-diallylacetamide, N,N-diallylpropionamide; N,N-diallylformamide; the N,N-diallylalkylsulfonamides, e.g. N,N-diallylmethanesulfonamide, N,N-diallylhexanesulfonamide; N,N-diallylbenzenesulfonamide; and the halo- (preferably chloro- or bromo-), nitro- and hydroxy-substituted amino compounds, e.g. N,N-diallylethanolamine, N,N-diallyl-3-propanolamine, N,N-diallyl-p-bromoaniline, N,N-diallyl-p-nitrobenzamide, and the like, and salts thereof.

Included within the mercaptan starting materials are hydrogen sulfide; the alkyl mercaptans, e.g. methyl mercaptan, ethyl mercaptan, propyl mercaptan, n-butyl mercaptan, n-decyl mercaptan, n-octadecyl mercaptan, isopentyl mercaptan, isobutyl mercaptan, and the like; the allyl mercaptans, e.g. allyl mercaptan; the carboxyalkyl mercaptans, e.g. mercaptoacetic acid, ethyl mercaptoacetate, and the like; thiophenol; the phenalkyl mercaptans, e.g. benzyl mercaptan, phenethyl mercaptan, phendecyl mercaptan, and the like; and the halo- (preferably chloro- or bromo-), and hydroxy-substituted mercaptans, e.g. 2-chloroethyl mercaptan, p-hydroxyphenethyl mercaptan, p-chlorobenzyl mercaptan, 2-mercaptoethanol, 3-mercapto-1-propanol, 2-mercapto-1-butanol, and the like.

The reaction conditions are those normally associated with free radical reactions. For example, at low temperatures (between 0° and 100°C.), either ultraviolet light alone, ultraviolet light with a chemical initiator, or high energy radiation can be used to initiate the reaction. At higher temperatures (between 25° and 150°C.), it is preferred to conduct the reaction in the presence of a chemical initiator. The preferred temperature range is between 60° and 125°C.

Typical of the chemical initiators that can be used are the azonitriles (e.g. azobisisobutyronitrile), the alkyl peroxides (e.g. di-t-butyl peroxide, lauryl peroxide), the acyl peroxides (e.g. acetyl peroxide, benzoyl peroxide) and the hydroperoxides (e.g. cumene hydroperoxide). In general, it is preferred to use between 0.001 and 0.1 mole of chemical initiator per mole of mercaptan (most preferably between 0.01 and 0.05 of initiator per mole of mercaptan.

The ultraviolet light that will catalyze the reaction is that of wave lengths between 1200 and 4000 angstroms. Typical sources producing this type of radiation include sunlight, carbon arcs, mercury vapor discharge lamps, fluorescent lamps and the like.

High energy radiation doses between 0.01 and 10 megarads administered at a rate between 40,000 rads per hour and 10 megarads per hour will also initiate the reaction. Typical sources of high energy radiation include cobalt-60, cesium-127, electron accelerators, X-ray machines and the like.

Cyclization is greatly favored by using a molar excess of diallyl ether or diallyl amine to mercaptan, but cyclization will occur using excess mercaptan, especially with the sulfonamides and diallylamides. A preferred ratio is at least 0.5 moles of diallyl amine or diallyl ether per mole of mercaptan, e.g. between 0.5/1.0 and 2.0/1.0 or greater.

Although not necessary to the invention, the reaction can be conducted in the presence of an inert solvent. Suitable solvents include the lower alcohols, e.g. ethanol, the aromatic hydrocarbons, e.g. benzene and the chlorinated hydrocarbons, e.g. carbon tetrachloride.

The new compounds of this invention are useful surface active agents, plasticizers for synthetic resins and as stabilizers. For example, they are plasticizers for polyvinyl chloride, polyvinyl acetate and various cellulose esters, e.g. cellulose acetate, and cellulose ethers, e.g. ethylcellulose. The new compounds formed by reacting the carboxyalkyl mercaptans are useful for stabilizing polyolefins, e.g. polyethylene. In addition, the new compounds of the present invention are biologically active. For example, not only are they entomologically active but they are also herbicides and bacteriocides.

DESCRIPTION OF SPECIFIC EMBODIMENT

The amine compounds used as starting materials can be amine salts. Preferred are the hydrohalides and especially the hydrochlorides, e.g. N,N-diallylamine hydrochloride can be used instead of N,N-diallylamine as a starting material as is demonstrated in Examples 1 and 2.

EXAMPLE 1

Preparation of 3-(n-dodecylthiomethyl)-4-methylpyrrolidine from N,N-diallylamine hydrochloride and n-dodecyl mercaptan A mixture of 67 g. (0.5 m.) of diallylamine hydrochloride in 100 ml. of t-butyl alcohol was refluxed under a nitrogen atmosphere while 75 g. (0.375 m.) of n-dodecyl mercaptan was added over a 30-minute period. Concurrently, 1.65 g. (0.01 m.) of azobisisobutyronitrile (hereafter AIBN) was added over a 1-hour period.

The mixture was heated for an additional 3 hours at 80°–85°C., the alcohol removed from the mixture at reduced pressure and the remaining mixture diluted with 300 ml. of water. A 10% solution of NaOH in water was used to neutralize the mixture and the product was removed therefrom by extraction with ethyl ether. After drying with $MgSO_4$, distillation of the extract gave 53.4 g. of 3-(dodecylthiomethyl)-4-methylpyrrolidine boiling at 153°–163°C. at 0.06 mm.

This compound was found to be an active herbicide. An aqueous solution containing 5 parts per million of this pyrrolidine was sprayed until run-off occurred on Pig Weed ETCC that was about 4 inches high. After 10–14 days, the Pig Weed sprayed with the pyrrolidine was killed while a control Pig Weed that was not sprayed remained unaffected.

EXAMPLE 2

3-(Butylthiomethyl)-4-methylpyrrolidine from N,N-diallylamine hydrochloride and n-butyl mercaptan A solution of 26.8 g. (0.2 mole) of diallylamine hydrochloride, 18 g. of (0.2 mole) n-butyl mercaptan and 0.32 g. (0.002 mole) of AIBN in 50 ml. of butanol was heated at reflux for 2 hours under nitrogen. After stirring at room temperature for two days, the reaction mixture was diluted with 250 ml. of water and extracted with ether. The aqueous layer was then made basic with 10% aqueous sodium hydroxide and the product was extracted with 75 ml. hexane followed by 25 ml. of ethyl ether. The combined extracts were washed with water and dried over sodium hydroxide pellets. Evaporation of the solvent and distillation gave 29 g. of the desired product, b.p. 95°–103°C./2 mm.

This compound is an active bacteriocide. Droplets containing Staphylococcus Aureus were placed on agar which contained 100 parts per million of this pyrrolidine. After suitable incubation and temperature control, it was observed that 100 percent kill of Staphylococcus Aureus was effected while the bacteria flourished in a control experiment wherein the agar contained no bacteriocide.

EXAMPLE 3

1,4-Dimethyl-3-(n-dodecylthiomethyl)pyrrolidine from N,N-diallylmethylamine and n-dodecyl mercaptan To a refluxing solution of 55.5 g. of methyldiallylamine and 1.65 g. (0.01 mole) of AIBN in 150 ml. of butanol under nitrogen atmosphere, there was added 25 g. of 1-dodecanethiol. Then 90 g. (a total of 0.52 mole) of 1-dodecanethiol was added dropwise over a period of two hours and reflux was continued for an additional 15 hours. The solvent and unreacted amine were removed under reduced pressure and the residue was distilled under high vacuum yielding 91.3 g. of the desired product being a light green-brown liquid, b.p. 140°–145°C. (0.04 mm.).

This compound is entomologically active. When Yellow Fever Mosquito Larvae were placed into an aqueous solution containing 1 part per million of this pyrrolidine, 100 percent kill was observed within 24 hours. No kill was observed in an aqueous control solution containing no pyrrolidine.

EXAMPLE 4

1,4-Dimethyl-3-(n-butylthiomethyl)pyrrolidine from N,N-diallylmethylamine and n-butyl mercaptan 0.56 g. of N,N-diallylmethylamine and 0.45 g. of n-butyl mercaptan were mixed together with 1 ml. of t-butyl alcohol in an 8 mm. glass tube under a nitrogen atmosphere. The tube was sealed and placed in a water bath at 20°–30°C. while being irradiated with a General Electric RS-275 sun lamp for 1.5 hours. Analysis showed that the product mixture contained 1,4-dimethyl-3-(n-butylthiomethyl)pyrrolidine.

In a test substantially the same as that conducted in Example 2, 100 parts per million of this pyrrolidine killed 100 percent Trichophton Mentagrophytes.

EXAMPLE 5

1-Hydroxyethyl-3-(n-butylthiomethyl)-4-methylpyrrolidine from N,N-diallyl-2-hydroxyethylamine and n-butyl mercaptan Using the same procedure as Example 2 without n-butyl alcohol and using 0.9 g. of n-butyl mercaptan and 1.4 g. of N,N-diallyl-2-hydroxyethylamine; 1-hydroxyethyl-3-(n-butylthiomethyl)-4-methylpyrrolidine was produced.

EXAMPLE 6

1-Acetyl-3-(n-butylthiomethyl)-4-methylpyrrolidine from N,N-diallylacetamide and n-butyl mercaptan A 250 ml. flask equipped with a stirrer, condenser and nitrogen sparge was charged with 97.4 g. (0.7 m.) of N,N-diallylacetamide and 0.7 g. of AIBN under a nitrogen atmosphere and heated to 70°C. Fifty ml. (0.446 m.) of n-butyl mercaptan was then added over a 75 minute period. The mixture was kept at 70°C. for an additional 7 hours and distilled to give about 85 g. of 1-acetyl-3-(n-butylthiomethyl)-4-methylpyrrolidine, b.p. 126°C./0.1 mm.

In a test substantially the same as that conducted in Example 1, 4 parts per million of this pyrrolidine killed 100 percent of Spiny Clotbur.

EXAMPLE 7

1-Formyl-3-(n-butylthiomethyl)-4-methylpyrrolidine from N,N-diallylformamide and n-butyl mercaptan The procedure described in Example 2 was followed using 87.5 g. (0.7 m.) of N,N-diallylformamide and 50 ml. (0.460 m.) of n-butyl mercaptan to give about 82 g. of 1-formyl-3-(n-butylthiomethyl)-4-methylpyrrolidine, b.p. 125°C./0.15 mm.

In a test substantially the same as that conducted in Example 2, 500 parts per million of this pyrrolidine killed 100 percent of Candida Albricans.

EXAMPLE 8

1-Formyl-3-(2-hydroxyethylthiomethyl)-4-methyl-pyrrolidine from N,N-diallylformamide and 2-mercaptoethanol A solution of 7.8 g. (0.1 mole) of 2-mercaptoethanol and 0.15 g. of AIBN in 20 ml. of i-propyl alcohol was heated to 70°C. and 12.5 g. (0.1 mole) of diallylformamide added dropwise over a 15 minute period. The solvent was removed under reduced pressure and the residue filtered to give 18 g. of nearly colorless liquid which analysis by nuclear magnetic resonance indicated to contain about 70% by weight of the desired pyrrolidine derivative.

EXAMPLE 9

1-Formyl-3-(allylthio)methyl-4-methylpyrrolidine from N,N-diallylformamide and allyl mercaptan A solution of 0.18 g. (0.0025 mole) of allyl mercaptan and 1.56 g. (0.0125 mole) of N,N-diallylformamide in a sealed glass tube was irradiated for 4 hours with a General Electric RS-275 sun lamp. 50% by weight of the product was the desired pyrrolidine.

EXAMPLE 10

Preparation of

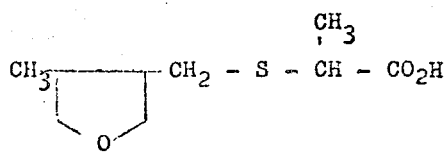

from thiolactic acid and diallyl ether

To a solution of 49 g. (0.5 mole) of diallyl ether and 100 cc. of methyl chloroform at 85°–90°C. was added slowly in 15 minutes a solution of 53 g. (0.5 mole) of thiolactic acid (HSCH(CH₃)CO₂H) and 0.82 g. (0.005 mole) of AIBN. The reaction mixture was heated at 85°–90°C. for an additional 4½ hours.

The reaction mixture was then heated to 140°C. at reduced pressure (0.02 mm.). 9 g. of volatiles was collected and 85.5 g. of residue remained. The residue was shown to contain 76% of the desired product.

EXAMPLE 11

Preparation of

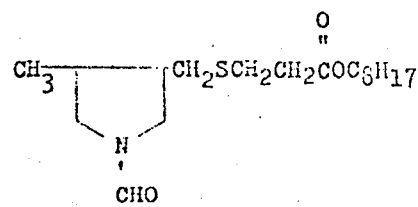

from N,N-diallylformamide and isooctyl β-mercaptopropionate

A solution of 109 g. (0.5 mole) of isooctyl β-mercaptopropionate and 0.82 g. (0.005 mole) of AIBN was added slowly in 30 minutes to 62.5 g. (0.5 mole) of N,N-diallylformamide at 80°–100°C. The reaction mixture was heated for an additional 1 hour at 90°C. The reaction mixture was then heated to 200°C. at reduced pressure (0.05 mm.). A small amount (3.5 g.) of volatiles was collected leaving behind 168 g. of residue. An infrared spectrum of the residue was consistent with the desired product. A portion of the residue (31.5 g.) was distilled and 21.5 g. (b.p. 200°C./0.5 mm.) of the desired product was obtained.

EXAMPLE 12

1-Methanesulfonyl-3-(butylthio)methyl-4-methyl-pyrrolidine from N,N-diallylmethanesulfonamide and n-butyl mercaptan A solution of 10 g. (0.056 mole) of N,N-diallylmethanesulfonamide, 20 ml. of benzene, and 0.08 g. of AIBN was heated to 70°C. and 10 g. (0.112 mole) of n-butyl mercaptan added dropwise during one hour. The mixture was heated an additional two hours and the solvent and excess butyl mercaptan removed under reduced pressure. Analysis of the colorless, viscous liquid indicated it to be predominantly the desired product.

In a similar manner, 1-formyl-3-(phenylthio)methyl-4-methylpyrrolidine was formed from N,N-diallylformamide and thiophenol although the conversion was only about 20–25%. N,N-diallylbenzenesulfonamide reacted readily with 2-phenylethanethiol to give 1-benzenesulfonyl-3-(2-phenylethylthiomethyl)-4-methyl-pyrrolidine.

In general, the pyrrolidine derivatives which do not contain an N-acyl or N-sulfonyl group are colorless to light yellow liquids with amine-like odors. The products are generally insoluble in water, but readily soluble in aqueous solutions of organic or mineral acids. The salts of those pyrrolidines derived from thiols having from about 10–16 carbons with organic acids such as formic or acetic or mineral acids such as hydrochloric acid are vigorous foamers in aqueous solutions. The free amines are also generally soluble in alcohols, ketones, or aromatic hydrocarbons.

Additional compounds obtainable by the practice of this invention are disclosed in the Table below, where R and R₁ are incorporated into the formula

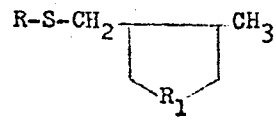

TABLE

| No. | R | R₁ |
|---|---|---|
| 1 | H | O |
| 2 | methyl | N-methyl |
| 3 | n-octadecyl | N-n-hexyl |
| 4 | isobutyl | N-allyl |
| 5 | H$(CH_2)_{12}$O-$\overset{O}{\overset{\|}{C}}$$(CH_2)_4$ | NH |
| 6 | phenethyl | O |
| 7 | p-dodecylphenethyl | O |
| 8 | m-bromobenzyl | O |
| 9 | o-chlorophenyl | O |
| 10 | 4-hydroxy-n-butyl | O |
| 11 | H | N-phenyl |
| 12 | ethyl | N-SO₂-phenyl |
| 13 | phenyl | N-iodoethyl |
| 14 | n-propyl | O |
| 15 | n-propyl | N-chloroethyl |
| 16 | H | N-$\overset{O}{\overset{\|}{C}}$$(CH_2)_2$CH₃ |
| 17 | methyl | O |
| 18 | CH₃-O-$\overset{O}{\overset{\|}{C}}$-CH₂- | O |
| 19 | ethyl | O |
| 20 | n-hexyl | O |
| 21 | H | N-SO₂$(CH_2)_3$CH₃ |
| 22 | phen-n-butyl | O |
| 23 | n-octyl | O |
| 24 | allyl | NH |
| 25 | H | N-hexenyl |
| 26 | H | N-$\overset{O}{\overset{\|}{C}}$$(CH_2)_{17}$CH₃ |
| 27 | phenyl | N-hydroxyethyl |
| 28 | methyl | nitroethyl |
| 29 | ethyl | O |
| 30 | H | N-phenethyl |

We claim:

1. A compound having the formula $$R-S-CH_2-\underset{O}{\underset{\diagdown\diagup}{CH-CH}}-CH_3$$

wherein R is H, alkyl having up to eighteen carbon atoms, carboxyalkyl of the type $(-CH_2-)_n COOR_2$ where $R_2$ is H or alkyl having up to 12 carbon atoms and $n$ is 1-4, allyl, phenyl, phenalkyl having up to sixteen carbon atoms, or a halo- or hydroxy-substituted group of the foregoing types.

2. A compound as defined in claim 1 wherein R is H or alkyl having up to 18 carbon atoms.

3. A compound as defined in claim 2 wherein R is alkyl having up to 12 carbon atoms.

4. A process for making a compound as defined in claim 1 comprising reacting by contacting, under free radical initiating conditions, an allyl compound having the formula $$CH_2=CH-CH_2-O-CH_2-CH=CH_2$$

with a mercaptan having the formula

R—SH where R is as defined in claim 1, and separating the desired product.

5. A process as defined in claim 4 wherein the molar ratio of allyl compound to mercaptan is at least 0.5/1.0.

* * * * *

UNITED STATES PATENT OFFICE
CERTIFICATE OF CORRECTION

PATENT NO. : 3,875,187
DATED : April 1, 1975
INVENTOR(S) : R. A. Hickner, C. J. Bredeweg and R. A. Plepys It is certified that error appears in the above-identified patent and that said Letters Patent are hereby corrected as shown below:

On the Title Page, column 1, in the title after "-4-METHYL" insert --TETRAHYDROFURANS--;

Column 1, line 8, delete "$(CH_2=CH-CH_2)_2 A$" and insert --$(CH_2=CH-CH_2)_2 A$--;

Column 1, line 27, delete "$-CH_2-_n COOR_2$" and insert --$(CH_2)_n COOR_2$--.

Signed and Sealed this fifth Day of August 1975

[SEAL]

Attest:

RUTH C. MASON
Attesting Officer

C. MARSHALL DANN
Commissioner of Patents and Trademarks